United States Patent
Farioli Brioschi et al.

(10) Patent No.: US 11,416,873 B2
(45) Date of Patent: *Aug. 16, 2022

(54) PERSONAL PROTECTION EQUIPMENT SYSTEM

(71) Applicant: 3M INNOVATIVE PROPERTIES COMPANY, St. Paul, MN (US)

(72) Inventors: Luca D. Farioli Brioschi, Cuajimalpa (MX); Luis V. Ramirez Chaidez, Coahuila (MX); Lawrence J. Ptasienski, North Oaks, MN (US); Mark T. Anderson, Woodbury, MN (US); Michael E. Hamerly, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/948,263

(22) Filed: Sep. 10, 2020

(65) Prior Publication Data

US 2020/0410507 A1    Dec. 31, 2020

Related U.S. Application Data

(63) Continuation of application No. 16/571,306, filed on Sep. 16, 2019, now Pat. No. 10,803,467, which is a
(Continued)

(51) Int. Cl.
*G06Q 30/00* (2012.01)
*H04B 5/00* (2006.01)
(Continued)

(52) U.S. Cl.
CPC ....... *G06Q 30/018* (2013.01); *G06F 16/2455* (2019.01); *G06F 16/951* (2019.01);
(Continued)

(58) Field of Classification Search
CPC ............. G06Q 30/018; G06Q 10/06; G06Q 10/06398; G06Q 10/087; G06F 16/2455;
(Continued)

(56) References Cited

U.S. PATENT DOCUMENTS

| 4,656,463 A | 4/1987 | Anders |
| 4,934,396 A | 6/1990 | Vitta |

(Continued)

FOREIGN PATENT DOCUMENTS

| DE | 19816396 | 11/1999 |
| DE | 10008048 | 9/2001 |

(Continued)

OTHER PUBLICATIONS

Durfee, Adam, , *White Paper on RFID, MEMS, and Their Application in the Field of Construction*, University of Kentucky, Jan. 11, 2002.

(Continued)

*Primary Examiner* — Joseph H Feild
*Assistant Examiner* — Sharmin Akhter
(74) *Attorney, Agent, or Firm* — Steven A. Bern

(57) ABSTRACT

A method for tracking procedures performed on personal protection equipment (PPE) and actions of individuals includes the following steps. An article of PPE configured with a smart tag is provided to an individual prior to performance of a task. After the individual performs the task, the article of PPE is processed. Information is retrieved from the smart tag during at least one of: before, during and after processing the article of PPE. After the performance of the task, the individual's data is read and the individual enters into a designated area.

13 Claims, 4 Drawing Sheets

Related U.S. Application Data continuation of application No. 15/959,457, filed on Apr. 23, 2018, now Pat. No. 10,445,747, which is a continuation of application No. 15/789,545, filed on Oct. 20, 2017, now Pat. No. 9,972,017, which is a continuation of application No. 15/237,755, filed on Aug. 16, 2016, now Pat. No. 9,799,038, which is a continuation of application No. 15/069,141, filed on Mar. 14, 2016, now Pat. No. 9,564,951, which is a continuation of application No. 12/600,106, filed as application No. PCT/US2008/063695 on May 15, 2008, now abandoned.

(60) Provisional application No. 61/066,127, filed on May 18, 2007.

(51) Int. Cl.
| | |
|---|---|
| *G06F 16/951* | (2019.01) |
| *G06F 16/2455* | (2019.01) |
| *G06Q 10/06* | (2012.01) |
| *G06Q 10/08* | (2012.01) |
| *G07C 9/28* | (2020.01) |
| *G07C 9/25* | (2020.01) |
| *G06K 7/10* | (2006.01) |
| *G08B 21/02* | (2006.01) |
| *H04L 67/306* | (2022.01) |
| *G06F 16/22* | (2019.01) |

(52) U.S. Cl.
CPC ..... *G06K 7/10009* (2013.01); *G06K 7/10415* (2013.01); *G06K 7/10544* (2013.01); *G06Q 10/06* (2013.01); *G06Q 10/06398* (2013.01); *G06Q 10/087* (2013.01); *G07C 9/257* (2020.01); *G07C 9/28* (2020.01); *G08B 21/02* (2013.01); *H04B 5/0062* (2013.01); *H04L 67/306* (2013.01); *H05K 999/99* (2013.01); *G06F 16/22* (2019.01); *Y04S 10/50* (2013.01)

(58) Field of Classification Search
CPC ... G06F 16/951; G06F 16/22; G06K 7/10009; G06K 7/10415; G06K 7/10544; G07C 9/257; G07C 9/28; G08B 21/02; H04B 5/0062; H04L 67/306; H05K 999/99; Y04S 10/50
See application file for complete search history.

(56) References Cited

U.S. PATENT DOCUMENTS

| | | | |
|---|---|---|---|
| 5,023,597 A | 6/1991 | Salisbury | |
| 5,164,707 A | 11/1992 | Rasmussen | |
| 5,552,772 A | 5/1996 | Janky | |
| 5,666,010 A | 9/1997 | Stratiotis | |
| 5,796,341 A | 8/1998 | Stratiotis | |
| 5,971,282 A | 10/1999 | Rollender | |
| 6,100,806 A | 8/2000 | Gaukel | |
| 6,144,301 A | 11/2000 | Frieden | |
| 6,472,988 B1 | 10/2002 | Feld | |
| 6,741,174 B2 | 5/2004 | Rhoades | |
| 6,853,303 B2 | 2/2005 | Chen | |
| 6,995,665 B2 | 2/2006 | Appelt | |
| 6,995,673 B1 | 2/2006 | Osredkar | |
| 7,019,652 B2 | 3/2006 | Richardson | |
| 7,044,373 B1 | 5/2006 | Garber | |
| 7,069,100 B2 | 6/2006 | Monette | |
| 7,098,793 B2 | 8/2006 | Chung | |
| 7,113,094 B2 | 9/2006 | Garber | |
| 7,123,151 B2 | 10/2006 | Garber | |
| 7,158,030 B2 | 1/2007 | Chung | |
| 7,375,640 B1 | 5/2008 | Plost | |
| 7,464,001 B1 * | 12/2008 | Adams | G06Q 10/06 702/183 |
| 8,760,260 B2 | 6/2014 | Farioli Brioschi | |
| 9,492,690 B2 | 11/2016 | Hamerly | |
| 9,536,209 B2 | 1/2017 | Holler | |
| 9,564,951 B2 | 2/2017 | Farioli Brioschi | |
| 9,665,999 B2 | 5/2017 | Farioli Brioschi | |
| 9,721,407 B2 | 8/2017 | Farioli Brioschi | |
| 9,798,992 B2 | 10/2017 | Farioli Brioschi | |
| 9,799,038 B2 | 10/2017 | Farioli Brioschi | |
| 2001/0047283 A1 | 11/2001 | Melick | |
| 2002/0008623 A1 | 1/2002 | Garber | |
| 2002/0031997 A1 | 3/2002 | Lawler, Jr. | |
| 2003/0014779 A1 | 1/2003 | Drotning | |
| 2004/0004547 A1 | 1/2004 | Appelt | |
| 2004/0020994 A1 | 2/2004 | Muehl | |
| 2004/0024501 A1 | 2/2004 | Muehl | |
| 2004/0088780 A1 | 5/2004 | Bachar | |
| 2004/0100384 A1 * | 5/2004 | Chen | G07C 9/28 340/572.1 |
| 2004/0131498 A1 | 7/2004 | Kuutti | |
| 2005/0131578 A1 | 6/2005 | Weaver | |
| 2005/0148828 A1 | 7/2005 | Lindsay | |
| 2005/0149387 A1 | 7/2005 | O'Shea | |
| 2005/0251424 A1 | 11/2005 | Sanders | |
| 2005/0258238 A1 | 11/2005 | Chapman | |
| 2006/0006999 A1 | 1/2006 | Walczyk | |
| 2006/0055552 A1 | 3/2006 | Chung | |
| 2006/0064320 A1 | 3/2006 | Postrel | |
| 2006/0071799 A1 | 4/2006 | Verdiramo | |
| 2006/0117610 A1 | 6/2006 | Silvestri | |
| 2006/0125623 A1 | 6/2006 | Appelt | |
| 2006/0231568 A1 | 10/2006 | Lynn | |
| 2006/0268482 A1 | 11/2006 | Lin | |
| 2007/0001837 A1 | 1/2007 | Larson | |
| 2007/0010721 A1 | 1/2007 | Chen | |
| 2007/0013519 A1 | 1/2007 | Chung | |
| 2007/0157290 A1 | 7/2007 | Crawford | |
| 2007/0199567 A1 | 8/2007 | Kanzer | |
| 2007/0250411 A1 | 10/2007 | Williams | |
| 2008/0131332 A1 | 6/2008 | Nguyen | |
| 2008/0189142 A1 | 8/2008 | Brown et al. | |
| 2009/0040014 A1 | 2/2009 | Knopf | |
| 2009/0058600 A1 | 3/2009 | Krepel | |
| 2011/0001602 A1 | 1/2011 | Farioli Brioschi | |
| 2011/0115629 A1 | 5/2011 | Holler | |
| 2011/0227700 A1 | 9/2011 | Hamerly | |
| 2011/0234374 A1 | 9/2011 | Insley | |
| 2012/0009463 A1 | 1/2012 | Lee | |
| 2017/0011323 A1 | 1/2017 | Farioli Brioschi | |

FOREIGN PATENT DOCUMENTS

| | | |
|---|---|---|
| EP | 1516640 | 3/2005 |
| EP | 1091316 | 3/2006 |
| FR | 2801998 | 6/2001 |
| GB | 2422937 | 8/2006 |
| JP | 06-299799 | 10/1994 |
| JP | 2005-078222 | 3/2005 |
| JP | 2006-072719 | 3/2006 |
| KR | 10-2006-0101405 | 9/2006 |
| KR | 10-2006-0123918 | 12/2006 |
| WO | WO 96/12524 | 5/1996 |
| WO | WO 2001/006401 | 1/2001 |
| WO | WO 01/43827 | 6/2001 |
| WO | WO 2001/044082 | 6/2001 |
| WO | WO 02/02191 | 1/2002 |
| WO | WO 02/09957 | 2/2002 |
| WO | WO 2002/013150 | 2/2002 |
| WO | WO 2004/008900 | 1/2004 |
| WO | WO 2004/013785 | 2/2004 |
| WO | WO 2004/032019 | 4/2004 |
| WO | WO 2004/074964 | 9/2004 |
| WO | WO 2005/024579 | 3/2005 |
| WO | WO 2005/045461 | 5/2005 |
| WO | WO 2005/045743 | 5/2005 |
| WO | WO 2005/048041 | 5/2005 |
| WO | WO 2005/071978 | 8/2005 |
| WO | WO 2005/109303 | 11/2005 |

(56) References Cited

FOREIGN PATENT DOCUMENTS

| WO | WO 2005/110216 | 11/2005 |
| WO | WO 2005/119590 | 12/2005 |
| WO | WO 2006/026365 | 3/2006 |
| WO | WO 2008/091164 | 7/2008 |

OTHER PUBLICATIONS

FrenchCreek Production product literature for *The Tracker* Harness Accessories.
WhereNet product literature for *Process Control and Machine Messaging* (2003).
Capital Safety ISafe Intelligent Safety System website literature, http://www.capitalsafety.com/Default.aspx?tabid=220 [retrieved from the internet Aug. 21, 2007].
Initiative Business Systems Respirator Management website literature, http://www.initbusy.com/rpecasestudy.html [retrieved from the internet May 17, 2007].
Swedberg, Claire, Safety Harnesses Get Smart, RFID Journal, Jun. 15, 2006.
Ward, Matt, RFID: Frequency, Standards, Adoption and Innovation, JISC Technology and Standards Watch, May 2006, pp. 16-20.
U.S. Appl. No. 15/789,395, filed Oct. 20, 2017, entitled "Method for Tracking Procedures Performed on Personal Protection Equipment and Actions of Individuals".
U.S. Appl. No. 15/789,458, filed Oct. 20, 2017, entitled "Method for Tracking Procedures Performed on Personal Protection Equipment and Actions of Individuals".
U.S. Appl. No. 15/789,501, filed Oct. 20, 2017, entitled "Method for Tracking Procedures Performed on Personal Protection Equipment and Actions of Individuals".

\* cited by examiner

PERSONAL PROTECTION EQUIPMENT SYSTEM

CROSS REFERENCE TO RELATED APPLICATIONS

This application is a continuation of U.S. application Ser. No. 16/571,306, filed Sep. 16, 2019, now allowed, which is a continuation of U.S. application Ser. No. 15/959,457, filed Apr. 23, 2018, now granted as U.S. Pat. No. 10,457,747, which is a continuation of U.S. application Ser. No. 15/789,545, filed Oct. 20, 2017, now granted as U.S. Pat. No. 9,972,017, which is a continuation of U.S. application Ser. No. 15/237,755, filed Aug. 16, 2016, now granted as U.S. Pat. No. 9,799,038, which is a continuation of U.S. application Ser. No. 15/069,141, filed Mar. 14, 2016, now granted as U.S. Pat. No. 9,564,951, which is a continuation of U.S. application Ser. No. 12/600,106, filed Sep. 2, 2010, now abandoned, which is a national stage filing under 35 U.S.C. § 371 of PCT/US2008/063695, filed May 15, 2008, which claims priority to U.S. Application Ser. No. 61/066,127, filed May 18, 2007, the disclosure of which is incorporated by reference in its/their entirety herein.

BACKGROUND

Generally, this disclosure relates to methods for tracking procedures performed on personal protection equipment (PPE) as well as tracking actions of individuals, particularly, using smart tags and individuals' biometrics.

Maintaining the safety and health of workers is has become a major concern across many industries. Various rules and regulations have been developed to aid in addressing this concern, which provide sets of requirements to ensure proper administration of personnel health and safety procedures. To help in maintaining worker safety and health, some individuals may be required to don, wear, carry, or otherwise use PPE, if the individuals enter or remain in work environments that have hazardous or potentially hazardous conditions. Known types of PPE include, without limitation, respiratory protection equipment (RPE), e.g., for normal condition use or emergency response, protective eyewear, such as visors, goggles, filters or shields, protective headwear, such as hard hats, hoods or helmets, hearing protection, protective shoes, protective gloves, other protective clothing, such as coveralls and aprons, protective articles, such as sensors, safety tools, detectors, global positioning devices, mining cap lamps and any other suitable gear.

For example, personnel working in mines, oil refineries, metal grinding facilities, industrial painting operations or pharmaceutical factories may be required to wear RPE. On the other hand, personnel in the nuclear industry may be required to wear radiation protective clothing and personal dosimetry devices. Law enforcement personnel are sometimes required to wear protective vests and helmets. There are numerous situations in the medical field in which healthcare workers must wear protective gowns, masks, face shields, gloves, etc. Workers in the food service industry are often required to wear hair netting, gloves, masks, etc. There are also many industrial manufacturing scenarios in which personnel are required to wear protective or other specially designed articles in order to ensure a "clean" environment. For example, personnel in the micro-electronics manufacturing industry, biotech industry, laboratory/testing industry, are required to wear PPE not only to ensure their own safety, but to protect the equipment and devices which they assemble or perform various procedures with. Another means of aiding prevention of professional diseases is for individuals to take active part in the prevention, for example by taking showers.

Facilities in which workers wear PPE are often required to keep detailed records regarding the PPE as well as the individuals wearing the PPE. Some such records include information regarding use of PPE, maintenance and condition of PPE, and training of the workers. In addition, records of certain mandatory regulations and compulsory audit histories must be kept for a certain period of time. For example, RPE require maintenance to be carried out by properly trained personnel. The making and keeping of extensive records that contain all of the above-referenced information present a substantial administrative task.

Known uses of RFID tags include ensuring that the personnel is properly outfitted with all necessary safety equipment for the performance of particular procedures that could expose them to health hazards. Radio Frequency Identification Devices (RFIDs) are low-cost "smart" chips or "tags" that can be embedded in or attached to articles, products, and the like, to convey information about the product via information retrieved by a scanner. The smart tags are typically provided in the form of small labels or the like with a miniature embedded antenna. The tags may be passive or active, the active tags requiring an internal power supply. A reader or scanner interrogates the smart tag with an electronic "trigger" signal. The tag in turn generates an electromagnetic pulses response that is readable by the scanner, the response containing the product or equipment information. Nonetheless, there still is a need for electronic systems that could make the implementation of compliance-monitoring systems easier and more efficient.

SUMMARY OF THE INVENTION

In one exemplary embodiment, the present disclosure is directed to a method for tracking procedures performed on PPE and actions of individuals including the steps of providing an article of PPE configured with a smart tag to an individual prior to performance of a task and processing the article of PPE after the individual performs the task. The exemplary method also includes retrieving information from the smart tag during at least one of: before, during and after processing the article of PPE. The method further includes reading the individual's data after performance of the task and the individual's entry into a designated area after performance of the task.

In another exemplary embodiment, the present disclosure is directed to a method for tracking procedures performed on articles of PPE and actions of individuals including the steps of providing an article of PPE configured with a first smart tag to a first individual prior to performance of a first task; retrieving first information from the first smart tag after the first individual performs the first task; and processing the article of PPE in a first cycle after the first individual performs the first task. The exemplary method also includes reading first individual's data after performance of the first task and first individual's entry into a designated area after performance of the first task. The exemplary method further includes providing a second article of PPE configured with a second smart tag to a second individual prior to performance of a second task; retrieving second information from the second smart tag after the second individual performs the second task; and processing the second article of PPE in a second cycle after the second individual performs the second task. In addition, the exemplary method includes reading a second individual's data after performance of the second task and the second individual's entry to a designated area after performance of the second task.

In yet another exemplary embodiment, the present disclosure is directed to a method for tracking procedures performed on PPE and actions of individuals including the steps of providing an article of PPE configured with a smart tag to an individual prior to performance of a task; processing the article of PPE after the individual performs the task; and retrieving information from the smart tag during at least one of: before, during and after processing the article of PPE. The exemplary method also includes reading individual's data after performance of the task; and individual's entry into a designated area after performance of the task; and reading an individual's data at the exit of the designated area.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, wherein.

DETAILED DESCRIPTION

Figure 1A:
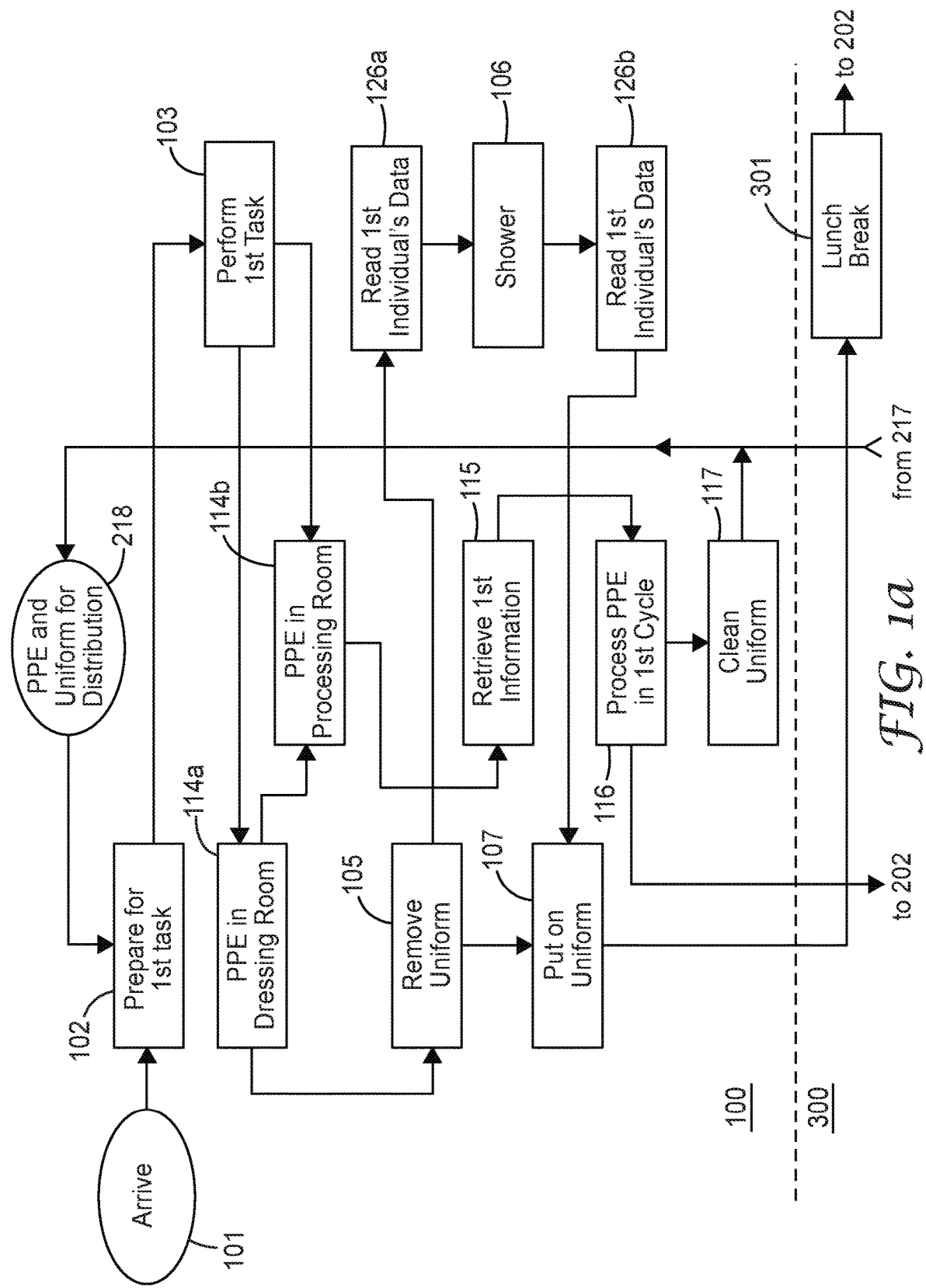
FIG. 1A is a first portion of a flow chart illustrating schematically an exemplary method according to the present disclosure.

The present invention provides an attractive solution for tracking the processing of PPE as well as actions performed by individuals. Exemplary procedures include status checks (such as reflectivity check on reflective clothing), inventory reconciliation, servicing, calibration (such as sensor calibration), maintenance, repair, replacement, treatment, and/or other useful, required or desirable procedures. One particular type of PPE treatment may include one or more of: removing dust by applying pressurized air, washing, cleaning, decontamination and sterilization.

Actions performed by individuals, for example, to maintain their safety and health, include, without limitation, remedial actions, such as taking showers, washing hands or changing clothing, and preventative actions, such as applying antibacterial agents, participating in medical examinations, physiological data reading, such as pulse, blood pressure, heart rate or temperature reading. In typical embodiments of the present disclosure, an individual takes any one or more of such actions in a designated area. The designated area may be an enclosed area, such as a separate room, or it may be an open area. In some exemplary embodiments, the designated area may be mobile, such as a van or a cart.

Exemplary methods according to the present disclosure anticipate that the carrying on and tracking of such procedures and individuals' actions must be coordinated with the tasks performed by the individuals in possession of the PPE, especially if the processing of an article of PPE and/or an action must be performed after each use of the PPE in performance of a task. In addition, it may be advantageous that the tracking be interwoven with the procedures and the tasks, so as not to unduly interfere with the day-to day operations of the business.

In typical embodiments of the present disclosure, one or more articles of PPE (and more typically a multitude of articles of PPE) are collected from one or more individuals (and more typically a multitude of individuals) for processing, which may include any one or more procedures mentioned above. Such procedures may be performed sequentially, cumulatively or simultaneously. After performance of procedure, the one or more articles of PPE can be provided to one or more individuals.

Configuring an article of PPE with a smart tag facilitates tracking the processing of PPE. Various types of smart tags are known in the art. Examples of smart tags that may be used in exemplary embodiments of the present disclosure include, but are not limited to, transponders or transceivers, which transmit a pulse of information in response to an excitation signal, and real time location systems (RTLS), which transmit data to a receiver or portal located by the tag. Suitable transponders or transceivers include RFID tags, such as read-only or re-writable RFID tags. RFID technology is known and understood by those skilled in the art.

The smart tags may be active or passive. Generally, passive smart tags include a coiled, etched, or stamped antenna, a capacitor, and a substrate on which the components are mounted or embedded. For some metallic smart tags, the metallic portion itself can serve as the antenna. The excitation signal from a scanner is received by the antenna to "activate" the smart tag. In the case of passive smart tags, the received excitation signal is the power source for the smart tag and results in the generation of an electromagnetic pulse containing information signal. One exemplary type of a suitable passive tag is a barcode tag. Active smart tags include active transceiving circuitry that has the capability to selectively respond to coded request signals issued by a scanner. A smart tag may include the capability to receive and store additional information beyond the information contained in its fixed code. An active smart tag usually requires an internal power supply, such as a micro-battery, thin film battery, or the like.

In case of RTLS, the smart tag operates differently depending on the system. Typically, an RTLS smart tag is an active tag having a transmitter and a receiver and it communicates with a network according to a particular protocol. RTLS systems can work to determine the position of the smart tag in 2-dimensional or 3-dimensional space. The position of the tag may be calculated either at the tag or by a remote processing system. One example of a smart tag suitable for use in RTLS is an Ekahau™ smart tag, which communicates with a wireless IEEE 802.11a (Wi-Fi) network through standard protocols. Other examples of suitable smart tags are provided, without limitation, in U.S. Pat. No. 6,853,303, incorporated by reference herein.

In accordance with the methods of the present disclosure, smart tags may be permanently attached to an article of PPE or to an accessory of an article of PPE, such as by being adhered, fastened, sewn, friction fitted, mechanically clipped, welded (e.g., ultrasonically) or molded onto or into the article, included as an integral component of the article, or securely attached by any other suitable means. Exemplary PPE accessories include, without limitation, a nose piece, a face piece, a hood, a helmet, a motor, a hose, a filter, a cartridge, hearing protection such as earmuffs or earplugs, an automatic darkening filter (ADF) of a welding helmet, a visor, power supply, a lighting mechanism such as a mining cap lamp, etc. In other exemplary embodiments, smart tags may be removably attached to an article of PPE or to an accessory of an article of PPE using hook and loop mechanical systems, repositionable adhesives, clips, slots, etc. Exemplary embodiments where the smart tag may be removed from an article of PPE, for example, together with an accessory of the PPE, are advantageous where the smart tag may be damaged by a procedure performed on PPE. Such potentially harmful procedures are typically those involving high temperatures, harsh chemicals such as acids or bases, corrosive gases, carcinogens, teratogens, sensitizers, and/or mechanical stress.

Where regulations or an individual's working conditions dictate that individual must wear more than one article of PPE to perform his/her tasks, it may be advantageous to configure each required article of PPE with a smart tag. In such exemplary embodiments, procedures performed on each required article of PPE may be tracked concurrently or independently. Independent tracking would be useful, for example, where at least two different articles of PPE undergo different types of procedures during their processing cycles.

In one exemplary embodiment one or more scanners may be used to retrieve information from smart tags. A scanner typically includes an antenna for transmitting a trigger signal to a smart tag and receiving a return signal from the tag containing information. Reading antennas may be placed in any one or more of the critical spots of the process, including but not limited to the area where the articles of PPE are handed over to be maintained and the area where the articles of PPE and/or their components or accessories are handed out to the individual. In other exemplary embodiments, one or more scanners may be hand-held.

In such exemplary embodiments, as the individual comes within the range of a scanner, the signal issued by the scanner may be received by an internal antenna in the smart tags. This signal causes the smart tags to generate and transmit an electromagnetic pulse containing the coded smart tag information. The scanner receives the coded information signal and decodes the signal into usable commands and data. For this purpose, the scanner usually includes a microprocessor and software programs. In some embodiments, the scanner provides an output to the individual in possession of the article of PPE or to the technician conducting a scan. The output may be in various forms, for example, in the form of or including issuing an audible or optical alarm or message, such as a warning or a recommendation.

However, information retrieval systems according to the present disclosure are not limited to scanners. In case of some active tags, no scanner is needed to retrieve information. The smart tag itself can initiate the transmission of data once it finds a suitable or designated receiver or portal. Generally, any system that is capable of retrieving information from a smart tag may be used.

Smart tags according to the present disclosure may be designed to carry a wide variety of information. In some exemplary embodiments, a passive read-only tag carries an identification number, such as the tag serial number. In other exemplary embodiments, smart tags may carry additional information, such as information related to the article of PPE the smart tag is associated with, information relating to an accessory of the PPE and information relating to the individual in possession of the PPE. Information related to the article of PPE or its accessory may include the next time it must be calibrated, cleaned, inspected or maintained; PPE historical information, such as the dates and times it was calibrated, cleaned, inspected or maintained; historical information relating to the use and tracking of the article of PPE or its accessory, including who used the article of PPE or its accessory, when it was used, and who retrieved information from its smart tag and when it was retrieved. Additional information may in some cases include an individual or department the PPE is assigned to, and the physical condition of the PPE.

Information relating to an individual may include any one or more of the following: the individual's name, individual's job function, a list of articles of PPE the individual is required to wear in performance of that individual's job function, whether the individual has performed certain actions, such preventative or remedial actions mentioned above, history of the individual's performance of certain actions or any other useful information. In some exemplary embodiments, information pertaining to a particular type of an individual may be compiled to form an individual profile. Individual profiles may be different for all individuals or they may be different for individuals performing different tasks or having different job functions.

The smart tag information retrieval system, such as a scanner, may be linked to a remote database having additional PPE, individual or other information. The information retrieval system may communicate with such database through a wireless or wired connection. The system may utilize a computer or server, which is Internet accessible. For example, a scanner, or a computer it is connected with, may provide the individual using the PPE, a scan technician or another user with Internet access to websites containing additional information. In one embodiment, the scanner may be an Internet accessible wireless device, such as a PDA (Personal Data Assistant) device. The scanner may include a display and a keypad for interactive communication with the remote database or Internet. The Internet websites may be maintained, for example, by manufacturers, suppliers, or vendors of the PPE.

With the exception of the smart tag identification number, any of the above-referenced information retrieved from the tags may be stored in the database. Each entry corresponding to an individual event or retrieval of information may be date and/or time stamped and this date/time information also may be stored in the database. Regulations, such as regulations applicable to processing particular types of articles of PPE, regulations pertaining to the actions recommended or required to be performed by individuals and other rules and regulations also may be stored in the database.

With the information that is thereby gathered in the database, one can extract various useful sets of data and identify violations. The data may be used to generate reports and memoranda, which may be provided to the individual performing the tasks and actions, the individual's supervisor, an auditor, an industrial hygienist, etc. These reports may include, without limitation: (1) accessing the dates of first use of all articles of PPE or their accessories, classified by type; (2) identifying which articles of PPE or their accessories are approaching a significant date, such as a date that maintenance needs to be performed; (3) identifying which articles of PPE or their accessories did not undergo the specified maintenance procedures; and (4) identifying individuals who failed to perform the remedial or preventative actions. These reports are expected to provide health administrators with hard data of the steps that are being taken towards compliance with rules and regulations.

Figure 1B:
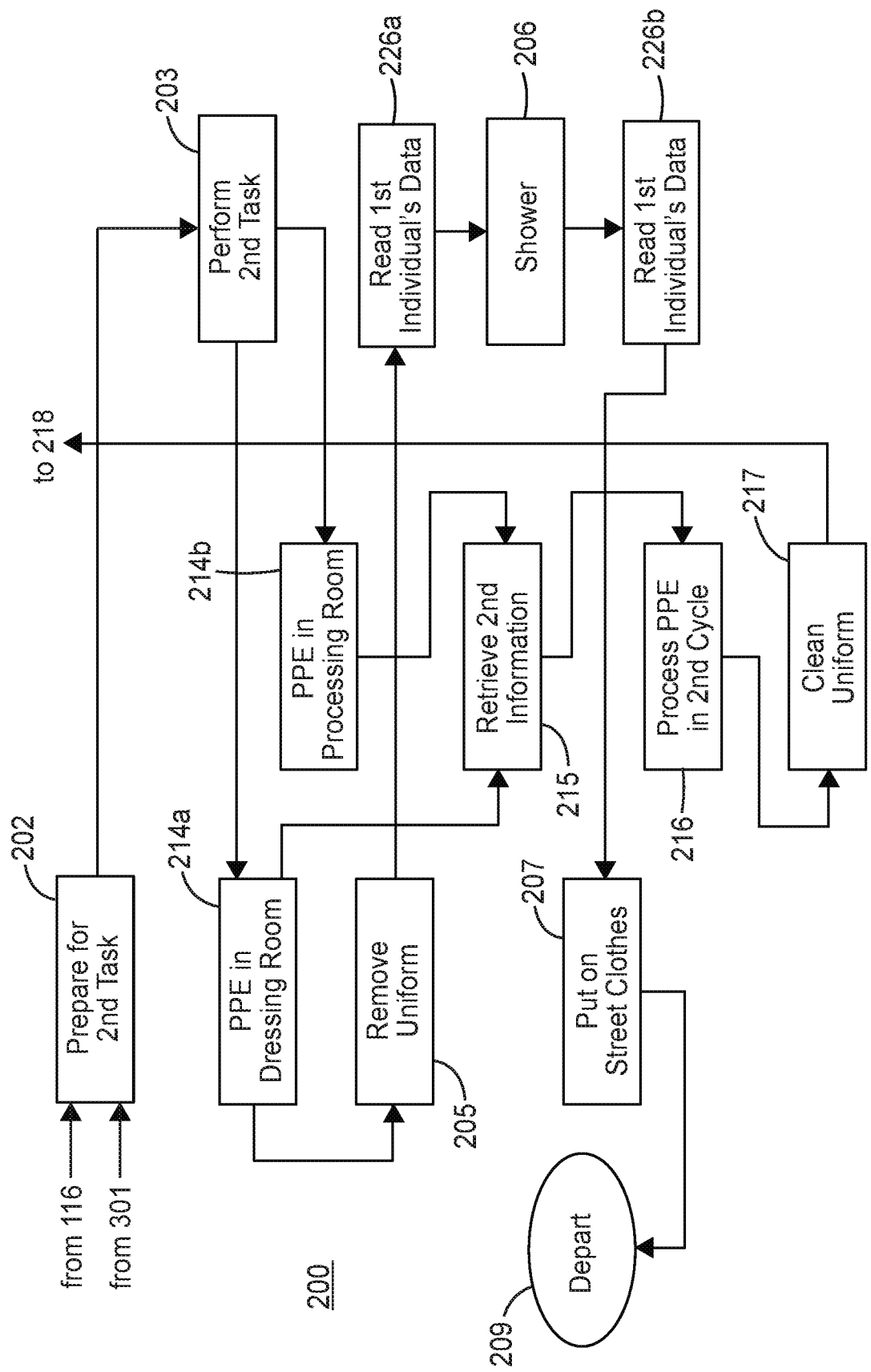
FIG. 1B is a second portion of a flow chart illustrating schematically an exemplary method according to the present disclosure.

FIGS. 1A and 1B illustrates schematically one exemplary method according to the present disclosure. This exemplary embodiment is a method for tracking procedures performed on an article of PPE, such as an RPE. In the exemplary method, a morning shift 100 begins with a first individual's arrival for work 101. In a preparatory step 102, prior to performance of the individual's first task 103, which in this exemplary embodiment constitutes activities of the morning shift 100, the first individual is provided with at least one article of PPE configured with a first smart tag. During the preparatory step 102, the first individual also may change into a uniform and make any other suitable preparations for the first task 103. Optionally, when the article of PPE is provided to an individual, first information may be retrieved, e.g., by scanning, from the first smart tag prior to the performance of the first task 103.

The information retrieved from the first smart tag may include at least one of: smart tag identification number, PPE information, PPE accessory information and individual information. The first information may be stored in a database and it may include a date and/or time stamp. In one embodiment, the first smart tag may be scanned to retrieve its serial number and at that time the first smart tag, or the article of PPE if the smart tag is not removed from the article of PPE, may be associated with an individual by entering the individual's name in the database. Alternatively, an individual's ID badge or another type of individual's ID may be read and time and/or date stamped, and that information may be stored in the database along with the smart tag information.

As the first information is retrieved from the first smart tag of the article of PPE when it is provided to the first individual, the system may evaluate the first information to check whether a particular requirement or condition is satisfied. For example, the system may check the processing or use history of the article of PPE and its accessories, which individual is assigned to this particular article of PPE and whether the individual associated with the article of PPE has performed certain actions, such as remedial or preventative actions. In some embodiments, the issuance of PPE can take place only if all the requirements have been satisfied. The system may also log the issuance of the PPE into an issue history, schedule the issued PPE for after-use processing, such as cleaning and maintenance, and update the stock level of available articles of PPE.

After performing the first task 103, the first individual turns in or otherwise makes available the article of PPE for processing in a first cycle 116, which in this exemplary embodiment includes cleaning and/or maintenance of the article of PPE. Depending on how the facility operates, after performing the first task, the first individual may leave the article of PPE in a container in the dressing room 114a, which may then be brought to the PPE processing room 114b by another individual. Otherwise, the first individual may deliver the article of PPE directly into the PPE processing room 114b. After turning in the article of PPE, the individual may remove the dirty uniform 105 and put on a clean uniform 107. In some facilities, the individual is also required to take a certain action in a designated area 106, as mentioned above, before putting on the clean uniform 107.

After performing the first task 103, and typically prior to the first individual's entry into the designated area 106, the first individual's data is read 126a. The first individual data may include any data sufficient to identify the individual, such as biometrics, e.g., fingerprint scan data, retinal scan data and facial recognition data. The data is typically time and/or date stamped and sent to a database for storage. At the exit from the designated area, for example, after or before the first individual's exit from the designated area, the first individual's data may be read again 126b. That data can also be date and/or time stamped and stored in a database. In some cases it is useful to determine a time interval between the step of reading the individual data after performance of the first task 126a and the step of reading the individual data at the exit from the designated area 126b. This time interval can be compared to a predetermined minimum time interval. If the time interval is shorter than the predetermined minimum, it may be concluded that the first individual had not taken all the actions he/she was required to take in the designated area. For example, in a lead mine or smelter, the operators may be required to shower for at least 5 minutes at least twice a day after each shift.

Thereupon, the first individual may commence a lunch break 300, during which he/she may go to a lunch area 301. During a first cycle 116, one or more procedures can be performed on the article of PPE, which may include cleaning, maintenance, repair, etc. In some exemplary embodiments, the first tag is not configured to withstand the processing, for example where the procedure requires exposing the smart tag to chemicals, mechanical stress and/or high temperatures. In such embodiments, smart tags may be advantageously permanently or detachably configured with a removable portion of an article of PPE, such as a removable accessory of the article of PPE. The smart tag itself, or a removable portion of the article of PPE with the smart tag, is detached before processing and attached to the same or a different article of PPE after processing. Such exemplary methods are particularly advantageous where large quantities of substantially the same type of PPE are cleaned together and where the articles of PPE have interchangeable removable portions to which a smart tag may be attached.

In such exemplary embodiments, after processing the article of PPE, the article of PPE may be provided with a part or accessory bearing a second smart tag, which may be the same or different as the first smart tag. In other exemplary embodiments, a first smart tag is not removed from the article of PPE prior to the first cycle, but instead remains configured with the same article of PPE through the performance of any one or more of the first and second cycles. After the first cycle is completed, the processed article of PPE may be delivered to a location easily accessible to individuals performing the tasks according to the present disclosure, for example, in the individuals' dressing or locker room. In some exemplary embodiments, where a particular article of PPE is associated with a particular individual, the processed article of PPE may be placed in the first individual's locker. Where the first individual's uniform is also being washed/cleaned 117, both the processed PPE and the clean uniform may be delivered 218 into the individual's locker.

In some exemplary embodiments, first information may be retrieved from the first smart tag 115 after the first individual performs the first task 103. Although FIG. 1A shows retrieving first information 115 prior to the first cycle 116, this step may be taken during the first cycle 116, after the first cycle 116, or at any two or more of those times. First information retrieved form the first smart tag after the first individual performs the first task 103 may also include at least one of: identification number, PPE information, PPE accessory information and individual information. The information may be stored in a database and it may include a date and/or time stamp. If the information is retrieved from the smart tag prior to the first cycle, the smart tag and the associated article of PPE may be marked in the database as unprocessed (e.g., contaminated, needing repair, needing inspection, etc.). In one implementation, prior to accessing the lunch area 301, the first individual hands over the respirator to a technician in charge of processing PPE. The technician retrieves first information from the smart tag using a scanner. The information may be wirelessly transmitted to a computer database.

Referring further to FIG. 1B, after the lunch break 300 ends, an afternoon shift 200 commences. Prior to performance of a second individual's second task 203, in a preparatory step 202, the second individual is provided with at least one article of PPE configured with a second smart tag. Where the smart tag had not been removed from the article of PPE and where an individual is associated with the article of PPE, the first smart tag is the same as the second smart tag and the first individual is the same as the second individual. Similar to the morning shift, when the article of PPE is provided to the second individual in a preparatory step 202, second information may be retrieved, e.g., by scanning, from the second smart tag prior to the performance of the second task 203.

The second information retrieved form the second smart tag may be the same as or different from the first information retrieved from the first smart tag. The second information may include at least one of: identification number, PPE information, PPE accessory information and individual information. The second information also may be stored in a database and it may include a date and/or time stamp. In one embodiment, the second smart tag may be scanned to retrieve its serial number and at that time the second smart tag, or the article of PPE if the smart tag is not removed from the article of PPE, may be associated with an individual by entering the individual's name in the database. Alternatively, an individual's ID badge or another type of individual's ID may be read and time stamped and that information may be stored in the database along with the smart tag information.

As the second information is retrieved from the second smart tag of the article of PPE when it is provided to the second individual, the system may check whether a particular requirement or condition is satisfied. For example, the system may check the processing or use history of the article of PPE and its accessories, which individual is assigned to this particular article of PPE and whether the individual associated with the article of PPE has performed certain actions, such as remedial or preventative actions. In some embodiments, the issuance of PPE can take place only if all the requirements have been satisfied. The system may also log the issuance of the PPE into an issue history, schedule the issued PPE for after-use processing, such as maintenance, and update the stock level of available articles of PPE.

After performing the second task 203, the second individual turns in or otherwise makes available the article of PPE for processing in a second cycle 216, which in this exemplary embodiment includes cleaning and/or maintenance of the article of PPE. Depending on how the facility operates, after performing the second task, the second individual may leave the article of PPE in a container in the dressing room 214a, which may then be brought to the PPE processing room 214b by another individual. Otherwise, the first individual may deliver the article of PPE directly into the PPE processing room 214b. After turning in the article of PPE, the individual may remove the dirty uniform 205 and put on street clothes 207, in which he/she will exit the facility. In some facilities, the individual is also required to take certain action(s) in a designated area 206, as mentioned above, before putting on the clean uniform 207.

Prior to the second individual's entry into the designated area 206, the second individual's data is read 226a. The first individual's data may include any data sufficient to identify the individual, such as biometrics, e.g., fingerprint scan data, retinal scan data and facial recognition data. The data is typically date and/or time stamped and sent to a database for storage. At the individual's exit from the designated area, e.g., after or before the second individual's exit from the designated area, the second individual's data may be read again 226b. That data can also be date and/or time stamped and stored in a database. In some cases it is useful to determine a time interval between the step of reading the second individual data after performance of the first task 226a and the step of reading the second individual data at the exit from the designated area 226b. This time interval can be compared to a predetermined minimum time interval. If the time interval is shorter than the predetermined minimum, it may be concluded that the second individual had not taken all the actions he/she was required to take in the designated area. Thereupon, the second individual may exit the facility 209.

The second cycle 216 may include the same one or more procedures as the first cycle 116, or it may include different procedures. The second tag also may not be configured to withstand the performance of the procedure(s) and may be advantageously permanently or detachably configured with a removable portion of an article of PPE, such as a removable accessory of the article of PPE. The smart tag itself or the removable portion of the article of PPE with the smart tag is detached before the second cycle 216 and attached to the same or a different article of PPE after the second cycle 216. After the second cycle is completed, the processed article of PPE may be delivered to a location easily accessible to individuals performing the tasks according to the present disclosure, for example, in the individuals' dressing or locker room. In some exemplary embodiments, where a particular article of PPE is associated with a particular individual, the processed article of PPE may be placed in the first individual's locker. Where the first individual's uniform is also being washed/cleaned 217, both the processed PPE and the clean uniform may be delivered 218 into the individual's locker at some time prior to the morning shift 100.

In some exemplary embodiments, second information may be retrieved from the second smart tag 215 after the second individual performs the second task 203. Although FIG. 1B shows retrieving second information 215 prior to the second cycle 216, this step may be taken during the second cycle 216, after the second cycle 216, or at any two or more of those times. Second information retrieved from the second smart tag after the second individual performs the second task 203 may include at least one of: identification number, PPE information, PPE accessory information and individual information. The second information may be stored in a database and it may include a date and/or time stamp. If the information is retrieved from the smart tag prior to performance of a procedure in a second cycle 216, the smart tag and the associated article of PPE may be marked in the database as unprocessed (e.g., contaminated, needing repair, needing inspection, etc.). In another implementation, prior to exiting the facility 209, the second individual hands over the PPE to a technician in charge of the processing PPE. The technician retrieves second information from the smart tag using a scanner. The information may be wirelessly transmitted to a computer database.

The first and second information, each retrieved at any one or more of the times mentioned, may be used to track the articles of PPE as they are being handed out, turned in, and processed. Each of the first or second information may be retrieved from the first or second smart tag on one occasion or on multiple occasions. Time stamping the first and second information when it is retrieved aids in creating comprehensive history of the article of PPE, its' accessories and the individuals using it. Some advantageous products of exemplary embodiments of the present disclosure include any one or more of the following:

a) Compiling a daily report of PPE usage, since it was first issued to an individual. If a particular use of PPE has violated a rule, regulation or policy, a warning memo could be send to the individual or the individual's supervisor.

b) Compiling a daily report of all articles of PPE that have been read in the processing area. If an article of PPE is missing from this report, it is assumed that the individual did not make it available for processing, and a warning memo could be addressed to this individual or the individual's supervisor.

c) A daily report of an individual's access to the designated area, such as a shower area. If one individual's data entry is missing, if there is only a record of entry but no exit or if the time between an individual's entry time and exit time is considered to small (e.g., less than 5 minutes), it is assumed that the individual did not comply with certain standards and a warning memo could be addressed to the individual or the individual's supervisor.

Figure 2:
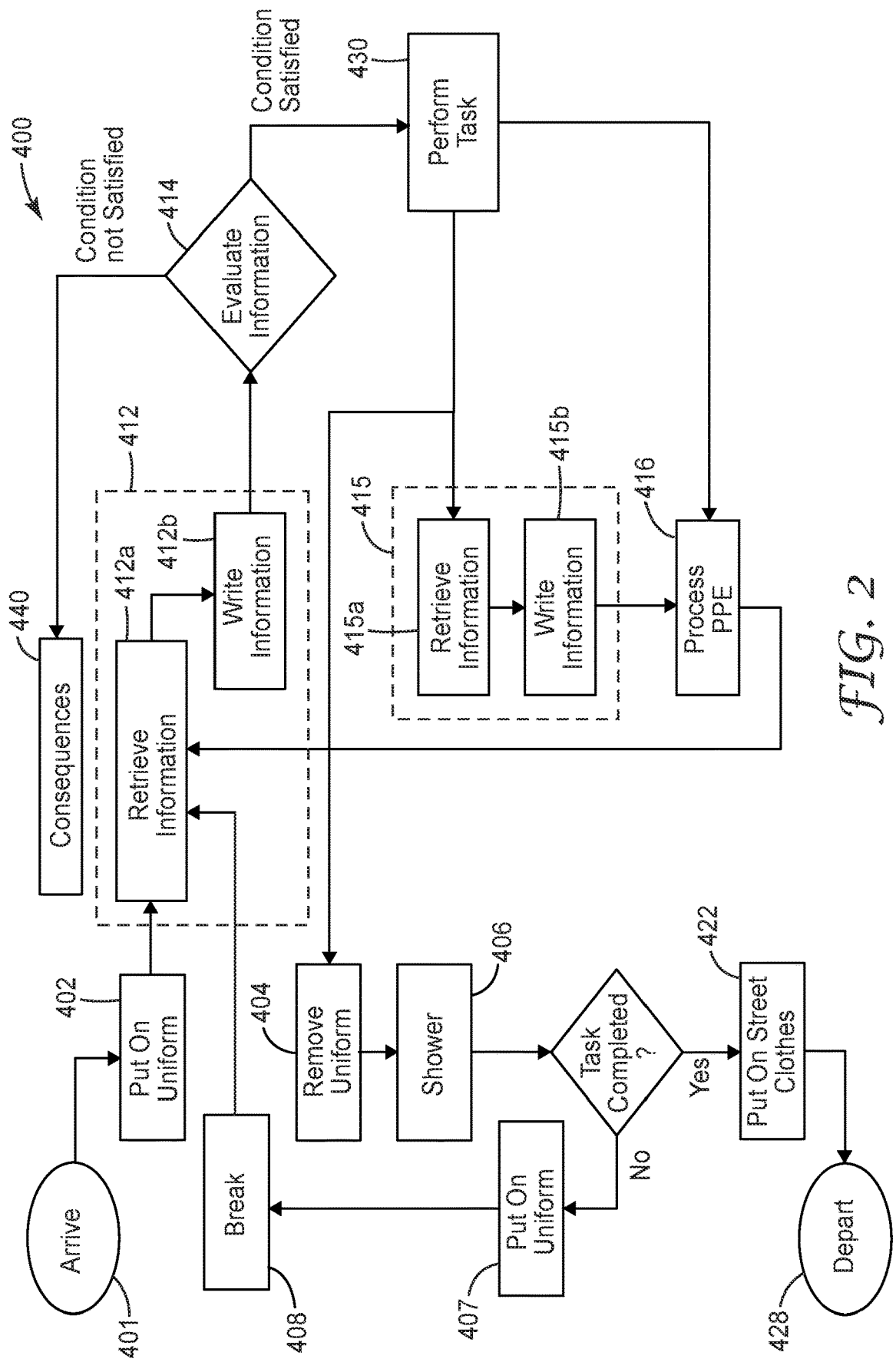
FIG. 2 is a flow chart illustrating schematically another exemplary method according to the present disclosure.

FIG. 2 shows another exemplary embodiment of the present disclosure illustrating consequences that may occur if, based on a result of an evaluation of any of the information retrieved from the first or second smart tag, it is determined that a condition or requirement is not satisfied. In an exemplary embodiment, it may be that the result of evaluation of the first information retrieved from the first smart tag does not satisfy a first condition, the second information retrieved from the second smart tag does not satisfy the second predetermined condition, or both.

In the exemplary method 400, an individual arrives for work 401 and may don a uniform or protective clothing 402. The individual is then provided with at least one article of PPE configured with a first smart tag in a preparatory step 412. Before the article of PPE is handed over to the individual, first information may be retrieved from the smart tag 412a. This information may include at least one of: identification number, PPE information, PPE accessory information and individual information. Optionally, at that time any useful additional information may be written to the smart tag 412b, such as the date of issuance of PPE, processing history, last date of processing, information regarding the user of PPE and/or the name of the technician who last scanned the smart tag, information regarding a requirement or prerequisite for users of this type of PPE, such as any additional article(s) of PPE that must be worn.

After first information is retrieved from the smart tag 412a, it is evaluated 414 against other available information, such as the information stored in a database. Examples of other information include any requirements for that article of PPE, accessory of PPE or the individual. For example, as the article of PPE is scanned when it is provided to the first individual, the system may check the history of the article of PPE and its accessories, and pertinent information relating to the first individual. In some exemplary embodiments, where two or more articles of PPE must be worn during the performance of a particular task, it may be advantageous to retrieve information from the smart tags of all of these articles, for example, to ensure that these articles are present, are all worn by the correct individual, and that all articles of PPE are in proper condition.

If the result of evaluation of the first information satisfies a predetermined condition, the individual is permitted to proceed to perform the task 430. In some exemplary embodiments, the result of evaluation of the first information must satisfy two or more predetermined conditions, such as a particular requirement pertaining to the article of PPE or its accessory and a particular requirement pertaining to the first individual. In such exemplary embodiments, the individual is permitted to proceed to perform the task 430 only if all the conditions are satisfied.

If at least one parameter of the first information does not satisfy a predetermined condition, the individual may be faced with consequences 440, such as not being allowed to perform the task 430, and, optionally, may be required to follow instructions provided audibly or on a display. The type of consequence may depend on the particular condition that has not been satisfied. The audible or visual message may indicate that PPE or its accessory is missing, out of calibration or has not been properly processed. Additionally, or alternatively, the message may indicate that the PPE was issued to the wrong individual or that the individual that last wore the PPE did not perform certain actions, such as preventative or remedial actions. Additionally, or alternatively, the individual may be denied access to performing the task, as explained in more detail below.

After performing the task 430, the individual turns in the article of PPE 415 and second information may be retrieved from its smart tags 415a. Optionally, at that time any useful additional information may be written to the smart tag 415b, such as entering the status of article of PPE as unprocessed, last date of processing, type of task used for, user history and/or the name of the technician who last scanned the smart tag.

The article of PPE is then processed 416, as described above, and made available for distribution in the preparatory step 412. After turning in the article of PPE, the individual may remove the dirty uniform 404. In some facilities, the individual is also required to take certain action in a designated area 406. If the individual has completed all the tasks for the day, the individual puts on street clothes 422 and departs the facility 428. If the individual's tasks are not completed, the individual puts on a clean uniform 407 and may then proceed to take a break 408 prior to resuming the tasks or performing any additional tasks.

Figure 3:
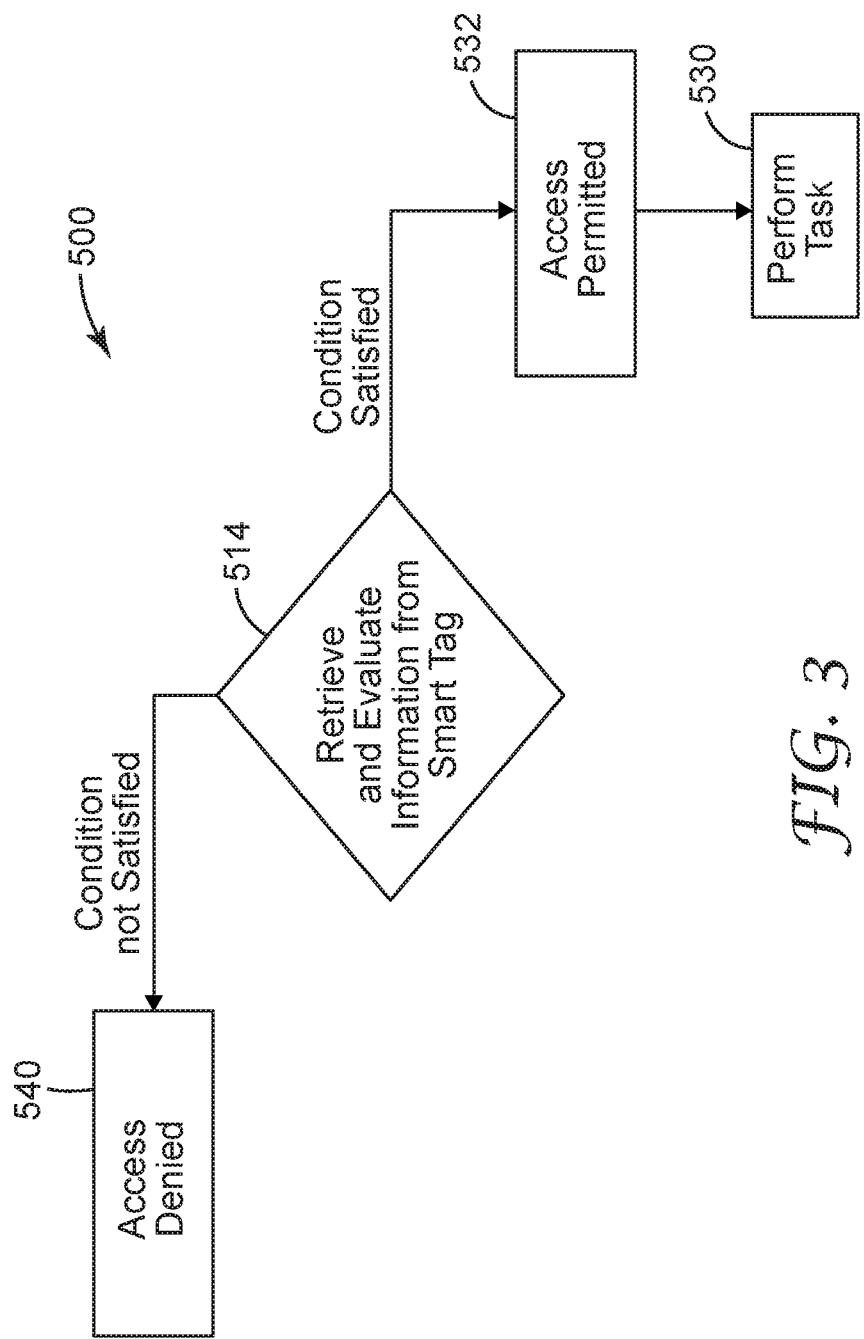
FIG. 3 is a flow chart illustrating schematically a portion of an exemplary method according to the present disclosure.

FIG. 3 shows another exemplary embodiment 500 of the present disclosure, which illustrates denying individual access to a task based on information retrieved from the smart tag. In the exemplary method 500, the information retrieval system, such as a scanner, may be operationally interfaced with an automatic gate or door, and particularly with the gate's lock control mechanism. The gate remains locked and is only opened if it is determined that the information retrieved from the smart tag satisfies at least one and preferably all predetermined conditions. Any configuration of automatic gate or door may be utilized in this regard. Examples of scanners operationally interfaced with gates or doors are described in U.S. Pat. Nos. 6,853,303 and 5,164,707, incorporated by reference herein.

After information is retrieved from the smart tag, it is evaluated 514 against the information stored in the database, such as any requirements for that article of PPE, accessory of PPE or the individual. If the result of evaluation of the first information satisfies at least one predetermined condition, the gate or door is opened or unlocked 532 and the individual is permitted access to proceed to perform a task 530. Alternatively, the gate or door may be initially open or unlocked and it remains open or unlocked if at least one condition is not satisfied. Preferably, access to the task 430 is permitted to the individual only if all predetermined conditions are satisfied.

If the result of evaluation based on the first information does not satisfy at least one predetermined condition, individual is denied access 540 to the task 530, for example, by not opening or locking the door, gate, etc. The access control feature described above may be used in any exemplary embodiments of the present disclosure at a point where information is retrieved from a smart tag. In addition to or alternatively to access denial, information as to the problem encountered may be transmitted to the individual or to the individual's supervisor, for example through a visual or auditory message or through a memo or report. Exemplary information may include a communication regarding missing or deficient PPE or PPE accessory, inappropriate usage of PPE or a PPE accessory, sensor out of calibration, etc.

In the exemplary embodiments where a particular smart tag is associated with a particular individual, the individual's identity may be used for verifying that any individual-specific requirements as to the PPE are satisfied. For example, the information retrieval system may include or be in communication with a computer having an electronically stored profile that is particular for each individual. This profile may include the necessary equipment pieces that are required to be worn by that respective individual. Upon the individual being identified, the profile is called up and the equipment accountability check is conducted against the profile. The system may include an electronic library or database containing a plurality of individual specific profiles. This system may be particularly useful wherein a number of individuals perform different tasks requiring different pieces of equipment.

Although the methods of the present disclosure have been described with reference to specific exemplary embodiments, those of ordinary skill in the art will readily appreciate that changes and modifications may be made thereto without departing from the spirit and scope of the present disclosure. For example, although the exemplary embodiment described in reference to FIGS. 1A and 1B included a morning shift an afternoon shift and a lunch break, those of ordinary skill in the art will readily appreciate that any cyclical tasks and procedures are within the scope of the present disclosure. For example, procedures performed in the first and second cycles may be monthly or yearly inspections or inventory checks. Furthermore, those of skill in the art will readily appreciate that all embodiments of the present disclosure may be used to track and retrieve information from a plurality of different articles of PPE, which may be required to be worn by an individual while performing a particular task.

What is claimed is:

1. A system for tracking procedures performed on personal protection equipment (PPE), the system comprising:
    a plurality of articles of PPE, with a smart tag attached to at least one article of PPE, wherein the smart tag carries an identifier of the at least one article of PPE and maintenance information related to the article of PPE;
    a scanner configured to read the smart tag that is attached to the at least one article of PPE, wherein when the scanner detects the smart tag the scanner receives the identifier of the at least one article of PPE; and
    a computing device communicatively coupled to the scanner, wherein the computing device:
    receives, from the scanner, the identifier of the at least one article of PPE;
    queries, based at least in part on the identifier, a database to determine whether an article of PPE did not undergo a needed maintenance procedure; and
    in response to the determination by the computing device that the article of PPE did not undergo a needed maintenance procedure, sends updated maintenance information related to the article of PPE that is written to the smart tag.

2. The system of claim 1, wherein the computing device generates a notification based at least in part on the determination that the article of PPE did not undergo a needed maintenance procedure.

3. The system of claim 2, wherein the warning is at least one of an audible of visual notification.

4. A method comprising:
    receiving, by a computing device and from a scanner, an identifier of at least one article of PPE included in a plurality of articles of PPE, wherein a smart tag is attached to the at least one article of PPE, wherein the smart tag carries the identifier of the at least one article of PPE and maintenance information related to the article of PPE, wherein the scanner is configured to receive the identifier of the at least one article of PPE when the scanner detects the smart tag;
    querying, based at least in part on the identifier, a database to determine whether an article of PPE did not undergo a needed maintenance procedure; and
    in response to determining that the article of PPE did not undergo the needed maintenance procedure, sending updated maintenance information related to the article of PPE that is written to the smart tag.

5. The method of claim 4, further comprising maintaining historical information about the at least one article of PPE and needed maintenance procedures associated with the at least one article of PPE.

6. The method of claim 5, wherein the historical information comprises an association between the identifier of the at least one article of PPE and one or more of a date or time that maintenance was previously performed on the at least one article of PPE.

7. The method of claim 4, further comprising generating a notification based at least in part on the determination that the article of PPE did not undergo the needed maintenance procedure.

8. The method of claim 7, wherein the warning is at least one of an audible of visual notification.

9. A computing device comprising:
    one or more computer processors; and
    a memory comprising instructions that when executed by the one or more computer processors cause the one or more computer processors to:
    receive, from a scanner, an identifier of at least one article of PPE included in a plurality of articles of PPE, wherein a smart tag is attached to the at least one article of PPE, wherein the smart tag carries the identifier of the at least one article of PPE and maintenance information related to the article of PPE, wherein the scanner is configured to receive the identifier of the at least one article of PPE when the scanner detects the smart tag;
    query, based at least in part on the identifier, a database to determine whether the article of PPE did not undergo a needed maintenance procedure; and
    send updated maintenance information related to the article of PPE that is written to the smart tag in response to determining that the article of PPE did not undergo the needed maintenance procedure.

10. The computing device of claim 9, wherein the memory comprises instructions that when executed by the one or more computer processors cause the one or more computer processors to maintain historical information about the at least one article of PPE and the determination that the article of PPE did not undergo the needed maintenance procedure is based at least in part on the historical information.

11. The computing device of claim 10, wherein the historical information comprises an association between the identifier of the at least one article of PPE and one or more of a date or time that maintenance was previously performed on the at least one article of PPE.

12. The computing device of claim 9, wherein the memory comprises instructions that when executed by the one or more computer processors cause the one or more computer processors to generate a notification based at least in part on the determination that the article of PPE did not undergo the needed maintenance procedure.

13. The computing device of claim 12, wherein the warning is at least one of an audible of visual notification.

\* \* \* \* \*

UNITED STATES PATENT AND TRADEMARK OFFICE
CERTIFICATE OF CORRECTION

PATENT NO. : 11,416,873 B2
APPLICATION NO. : 16/948263
DATED : August 16, 2022
INVENTOR(S) : Luca Daniele Farioli Brioschi It is certified that error appears in the above-identified patent and that said Letters Patent is hereby corrected as shown below:

In the Claims

Column 14
Line 14, In Claim 3, delete "audible of visual notification" and insert -- audible or visual notification --, therefor.
Line 46, In Claim 8, delete "audible of visual notification" and insert -- audible or visual notification --, therefor.

Column 15
Line 21, In Claim 13, delete "audible of visual notification" and insert -- audible or visual notification --, therefor.

Signed and Sealed this
Twenty-third Day of May, 2023

Katherine Kelly Vidal
Director of the United States Patent and Trademark Office